United States Patent
Regner et al.

(10) Patent No.: US 10,363,953 B2
(45) Date of Patent: Jul. 30, 2019

(54) STEERING COLUMN FOR A MOTOR VEHICLE

(71) Applicants: ThyssenKrupp Presta AG, Eschen (LI); ThyssenKrupp AG, Essen (DE)

(72) Inventors: Sebastian Regner, Lindau (DE); Hieronymus Schnitzer, Gamprin (LI); Carsten Manneck, Feldkirch (AT); Stefan Sawall, Gams (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 168 days.

(21) Appl. No.: 15/129,706

(22) PCT Filed: Mar. 18, 2015

(86) PCT No.: PCT/EP2015/055667
§ 371 (c)(1),
(2) Date: Sep. 27, 2016

(87) PCT Pub. No.: WO2015/144521
PCT Pub. Date: Oct. 1, 2015

(65) Prior Publication Data
US 2017/0129531 A1  May 11, 2017

(30) Foreign Application Priority Data
Mar. 28, 2014 (DE) .................. 10 2014 104 354

(51) Int. Cl.
*B62D 1/19* (2006.01)
*F16F 7/12* (2006.01)
(Continued)

(52) U.S. Cl.
CPC ............. *B62D 1/195* (2013.01); *B62D 1/184* (2013.01); *B62D 1/185* (2013.01); *B62D 5/04* (2013.01);
(Continued)

(58) Field of Classification Search
CPC ......... B62D 1/195; B62D 1/185; B62D 1/184
See application file for complete search history.

(56) References Cited

U.S. PATENT DOCUMENTS 5,788,278 A * 8/1998 Thomas ................. F16F 7/123
280/777
6,017,084 A * 1/2000 Carroll, III .......... B60N 2/4249
280/751
(Continued)

FOREIGN PATENT DOCUMENTS

| CN | 102325687 A | 1/2012 |
| CN | 102712331 A | 10/2012 |

(Continued)

OTHER PUBLICATIONS

International Search Report for International Patent Application No. PCT/EP2015/055667 dated Jul. 14, 2015 (dated Jul. 24, 2015).
(Continued)

*Primary Examiner* — James A English
(74) *Attorney, Agent, or Firm* — thyssenkrupp North America, Inc.

(57) ABSTRACT

A steering column for a motor vehicle may include a supporting unit and a displacement unit. The supporting unit may be connectable to a chassis of the motor vehicle, and the displacement unit may be displaceable relative to the supporting unit along a displacement path in a crash event. The steering column may further include an energy absorption element positioned between the supporting unit and the displacement unit. In a crash event, the energy absorption
(Continued)

element may absorb energy over the displacement path. In some examples, the energy absorption element includes local laser solidifications that help control an energy absorption level of the energy absorption element.

22 Claims, 3 Drawing Sheets (51) Int. Cl.
    *B62D 1/184* (2006.01)
    *B62D 1/185* (2006.01)
    *B62D 5/04* (2006.01)
    *B62D 5/06* (2006.01)

(52) U.S. Cl.
    CPC .................. *B62D 5/06* (2013.01); *F16F 7/12* (2013.01); *F16F 2226/023* (2013.01)

(56) References Cited

U.S. PATENT DOCUMENTS

| | | | | |
|---|---|---|---|---|
| 6,378,939 | B1* | 4/2002 | Knoll | B60N 2/4242 188/374 |
| 2006/0214411 | A1* | 9/2006 | Ikegaya | B62D 1/19 280/777 |
| 2006/0290128 | A1* | 12/2006 | Ridgway | B62D 1/195 280/777 |
| 2009/0033082 | A1* | 2/2009 | Klukowski | B62D 1/195 280/777 |
| 2014/0150595 | A1* | 6/2014 | Riefe | B62D 1/195 74/492 |
| 2014/0251059 | A1* | 9/2014 | Russell | B62D 1/195 74/492 |

FOREIGN PATENT DOCUMENTS

| | | |
|---|---|---|
| DE | 3626799 A1 | 2/1987 |
| DE | 102005052123 B3 | 1/2007 |
| DE | 102006020650 B3 | 8/2007 |
| DE | 102007002091 A1 | 7/2008 |
| DE | 102008034807 B3 | 10/2009 |
| DE | 102011120182 A1 | 6/2012 |
| JP | 2008230266 A | 10/2008 |
| WO | 2012084144 A1 | 6/2012 |

OTHER PUBLICATIONS

English Language Abstract for DE102005052123.
English Language Abstract for DE102008034807.
English language Abstract for DE 102011120182 A1 listed above.
English language Machine translation for DE 3626799 A1 listed above.
Chinese office action issued in corresponding application No. CN201580017278.2, dated Apr. 4, 2018. [English translation unavailable].

* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2015/055667, filed Mar. 18, 2015, which claims priority to German Patent Application No. DE 10 2014 104 354.5 filed Mar. 28, 2014, the entire contents of both of which are incorporated herein by reference.

FIELD

The present disclosure relates to steering columns wherein energy absorption levels can be adapted more easily.

BACKGROUND

Steering columns in motor vehicles are known, in which a supporting unit which is connectable to the chassis of the motor vehicle, for example in the form of bracket parts, is provided, and a displacement unit which is held on the supporting unit and comprises, for example, a steering column tube, is provided, wherein a steering spindle is mounted rotatably in the displacement unit. The displacement unit is arranged here displaceably in relation to the supporting unit in order to provide flexibility of the steering wheel in the event of a crash by means of a corresponding displacement of the displacement unit in relation to the supporting unit connected to the chassis, in order to improve the crash behavior. When the displacement unit is displaced in relation to the supporting unit, an energy absorption device which comprises an energy absorption element absorbs crash energy, wherein different configurations are known here via which crash energy can be absorbed in a controlled manner over the displacement path of the displacement unit in relation to the supporting unit.

For example, DE 10 2005 052 123 B3 discloses a steering column in which an energy absorption part is provided between the supporting unit and the displacement unit, said energy absorption part being secured on the displacement unit and comprising an elongated hole. A bolt which is secured on a rail and comprises widened portions and which, during normal operation, is secured on the supporting unit via a fixing element is guided in the elongated hole. In the event of a crash, the bolt can thus move in the elongated hole, wherein, because of the widened portions of the bolt, the energy absorption part, and in particular the elongated hole of the energy absorption part, is deformed in such a manner that a controlled absorption of energy over the displacement path is achieved.

DE 10 2008 034 807 B3 pursues an alternative concept, wherein a displacement unit is likewise arranged here displaceably in relation to a supporting unit, wherein the displacement unit and the supporting unit are not displaced in relation to each other during normal operation, but a displacement of the displacement unit in relation to the supporting unit is provided in the event of a crash in order to absorb energy. A bending strip is provided between an engagement part, which is secured on the supporting unit during normal operation, and a rail, which is secured on the displacement unit, which bending strip is configured in such a manner that, in the event of a crash, it absorbs energy in a defined manner by means of its deformation during a displacement of the displacement unit in relation to the supporting unit.

Via the energy absorption mechanisms, i.e., for example, the deformation of the elongated hole of the energy absorption part or the deformation of the bending wire or bending strip, a predefined force-travel behavior can be correspondingly predefined for the absorption of the crash energy over the displacement path in the event of a crash since the relative displacement between the supporting unit and the displacement unit can always be the same and is not changed by the longitudinal adjustment of the steering column.

The energy absorption mechanisms described require, for their construction, in each case at least three parts in the form of an engagement part, a rail and the bolt or the bending strip.

DE 10 2007 002 091 A1 discloses a steering column with a crash device, in which a bead is provided as the crash device, which bead is deformed by the displacement of the guide box during the crash.

As energy absorption elements, different geometrical configurations, for example bending tabs, bending wires, bending tear tabs and crash beads, are known from the prior art. For each adaptation of the energy absorption level to a type of vehicle, the energy absorption elements known from the prior art have to be adapted in each case with regard to their geometry and/or with regard to their material and the material strength. This accordingly requires investments in new tools and in the corresponding tests for each energy absorption element adapted in this manner.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element.

Accordingly, a steering column for a motor vehicle is proposed, comprising a supporting unit which is connectable to the chassis of the motor vehicle, and a displacement unit which is displaceable in relation to said supporting unit along a displacement path in the event of a crash, wherein an energy absorption element is arranged between supporting unit and displacement unit and, in the event of a crash, absorbs energy over the displacement path. According to the invention, the energy absorption element has local laser solidifications.

Owing to the fact that the energy absorption element comprises local laser solidifications, the energy absorption level of the energy absorption element can be adjusted by selection of the geometry, number, shape and thickness of the local laser solidifications. The effect which can therefore be achieved is that, for different uses, for example for installation in different types of motor vehicle steering column, the energy absorption element can in each case be adapted individually to the requirements without the geometry, the material or the material strength of the energy absorption element itself having to be changed. On the contrary, it suffices to act upon the energy absorption element with laser energy in such a manner that local laser solidifications which vary according to type of vehicle are provided. By means of the local laser solidification, the structure of the basic material of the energy absorption element is changed to the effect that a partial increase in the hardness is achieved and, as a result, a change/increase in the strength measures is obtained in the partial region.

It is therefore possible to dispense with investments in additional tools for producing different energy absorption elements for different types of vehicle. On the contrary, by means of the corresponding variation in the design of the local laser solidifications, a multiplicity of different requirements imposed on the force-travel profile of the energy absorption element can be covered with a single initial energy absorption element.

For a correspondingly predefined energy absorption level, only the width, number, arrangement and/or shape of the local laser solidifications which provide the energy absorption level therefore still have to be determined, and then said local laser solidifications are introduced into the initial energy absorption element. A large number of different types of motor vehicle can therefore be served using an identical construction of the steering column, wherein the corresponding required local laser solidification of the energy absorption element, which laser solidification is suitable for the particular type of motor vehicle, is achieved merely by action upon the initial energy absorption element with the corresponding laser light pattern.

The energy absorption element can be, for example, a bending tab, a bending wire, a bending tear tab and/or a crash bead, which can then be correspondingly adapted in its respective energy absorption level to the requirements of the respective type of motor vehicle via an at least local laser solidification by means of being acted upon with laser energy.

The local laser solidification in the energy absorption element can be provided in a linear, polygonal, zigzag-shaped, or meandering manner, in a manner lying in the area of the energy absorption element, or lying along the outer contour and/or along the inner contour of the energy absorption element, or as a line, as a partial surface and/or over the full surface, to describe only a few of the possible geometries for action upon the energy absorption element with the laser energy.

The energy absorption element preferably has local laser solidifications which have been selected from two different possible local laser solidifications that vary in width, number and/or arrangement. It is thus possible simply to select the appropriate local laser solidification for the respective type of vehicle from a predefined selection of different local laser solidifications.

The energy absorption element is preferably selected from at least two energy absorption elements which comprise the same material, the same geometry and the same material strength, but comprise dissimilar local laser solidifications in order to provide the absorption level desired for the respective type of motor vehicle.

The energy absorption element can be arranged, for example, between a supporting element in the form of a bracket which is connectable to the respective motor vehicle and a holding slide which is displaceable in relation to said bracket and which serves for holding a guide box of the steering column.

The energy absorption element can also be arranged between a supporting element, which is securable on the chassis of the motor vehicle, and an adjustment element for adjusting the position of a steering spindle in order to adjust the position of a steering wheel accommodated on the driver-side end of the steering spindle, said supporting element and adjustment element likewise being displaceable in relation to each other in the event of a crash.

The abovementioned object is furthermore achieved by a method with the features of claim 9. Advantageous developments emerge from the dependent claims.

Accordingly, a method for adapting the energy absorption behavior of a steering column to a type of motor vehicle is proposed, wherein the steering column comprises an energy absorption element. According to the invention, local laser solidifications are introduced into the energy absorption element in order to adapt the energy absorption behavior of the energy absorption element to the type of vehicle.

Those having ordinary skill in the art will understand that identical, similar or identically acting elements in the various figures are denoted here by identical reference signs.

Figure 1:
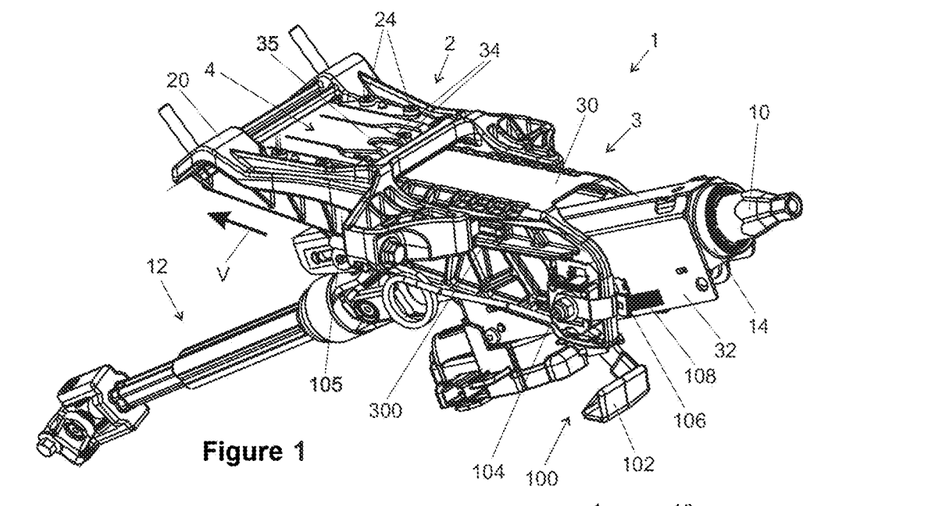
FIG. 1 is a schematic perspective view of an example steering column.
Figure 2:
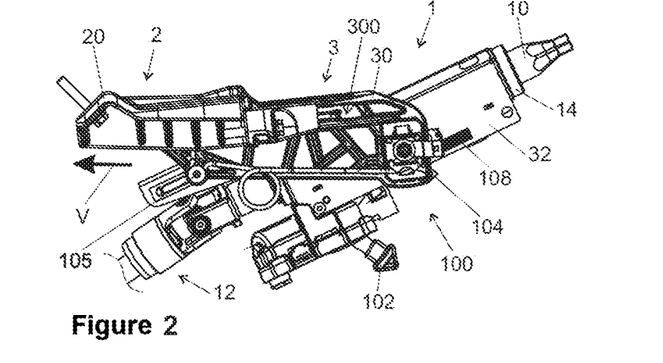
FIG. 2 is a schematic side view of the steering column of FIG. 1 in an initial position for use during a normal driving mode.
Figure 3:
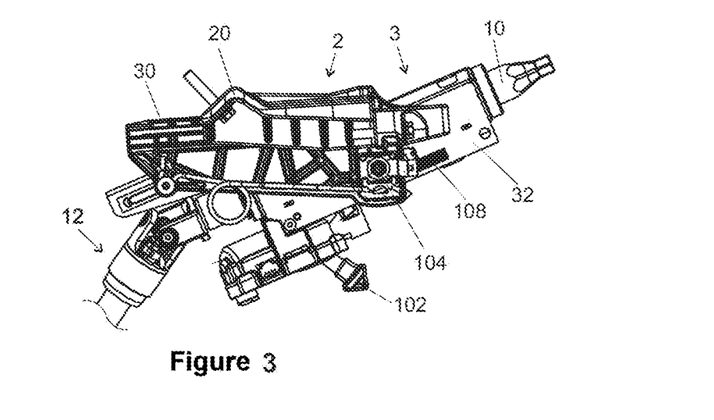
FIG. 3 is a schematic side view of the steering column of FIGS. 1 and 2 after displacement of an example displacement unit in relation to an example supporting unit following a crash event.

FIGS. 1 to 3 show a steering column 1 which supports a steering spindle 10, at the driver-side end of which a steering wheel (not shown here) can be mounted, via which the driver can then apply a steering torque to the steering spindle 10. The steering torque is transmitted by the steering spindle 10 via a steering shaft 12 to a steering pinion (not shown) which meshes with a rack (likewise not shown) which then, for its part, transmits the predefined steering angle to the steerable wheels of the motor vehicle via corresponding tie rods. An electric and/or hydraulic power assistance can be provided in order to assist the steering torque entered via the steering spindle 10 or in order to introduce an additional steering angle into the steering system, said steering angle then being added to the steering angle applied by the driver via the steering wheel.

The steering column 1 comprises a supporting unit 2 with a bracket 20 which is connectable to the chassis of a motor vehicle.

A displacement unit 3 is held on the supporting unit 2 and is displaceable along a displacement path in relation to the supporting unit 2. The displacement unit 3 comprises a holding slide 30 which holds a guide box 32 in which a steering column tube 14 with the steering spindle 10 mounted rotatably therein is arranged.

In the event of a crash, the displacement unit 3 is displaceable along a displacement path (indicated schematically by the arrow V) in relation to the supporting unit 2. In order to provide this displaceability, the holding slide 30 is held on the supporting unit 2 via a clamping guide 300, but, in the event of a crash, is correspondingly displaceable after overcoming the static friction provided by the clamping.

In order to prevent displacement of the displacement unit 3 in relation to the supporting unit 2 during normal operation, but to provide a defined absorption of energy along the entire displacement path V during a displacement, an energy absorption element 4 is provided which is arranged between supporting unit 2 and displacement unit 3. When the displacement unit 3, for example the holding slide 30, is displaced in relation to the supporting unit 2, for example the bracket 20, the energy absorption element 4 tears and/or is deformed and, in the process, absorbs crash energy over the displacement path V. By the driver striking against the steering wheel (not shown here), the crash energy is customarily entered here in such a manner that the displacement unit 3 is displaced in relation to the supporting unit 2.

FIGS. 2 and 3 show two different positions of the displacement unit 3 relative to the supporting unit 2. FIG. 2 shows the initial position of the steering column 1, in which the holding slide 30 is not displaced in relation to the supporting unit 2. In this initial position of the steering column 1, the normal operation of the motor vehicle takes place.

By contrast, in FIG. 3, the displacement unit 3 in the form of the holding slide 30 has been displaced along the displacement path V in relation to the supporting unit 2 in such a manner that the steering spindle 10 has receded by the displacement path V in relation to its initial position. The steering column 1, in particular the displacement unit 3, takes up this configuration if the displacement unit 3 has traversed the entire displacement path V and has accordingly arrived at a rear end of the displacement path. At least part of the crash energy entered into the steering column 1 and in particular to the displacement unit 3 via the steering wheel can thus be absorbed in a defined manner by the energy absorption element 4 over the displacement path between the initial position and the displaced position. The energy absorption element 4 is deformed and/or torn here.

In the exemplary embodiment shown, the energy absorption element 4 is designed as a bending tear tab which both bends and also tears at pre-notched points. Energy is accordingly dissipated by the energy absorption element 4 by the material of the energy absorption element 4 tearing and bending.

The guide box 32 can both be displaced and inclined in relation to the holding slide 30 in order to be able to carry out a positional adjustment of the driver-side end of the steering spindle 10 in order to adapt the position of the steering wheel mounted on the steering spindle 10 to the respective seat position of the driver of the motor vehicle. In order to achieve this adjustment of the position, a clamping mechanism 100 which is known per se is shown, in which a clamping bolt 104 is actuated via a clamping lever 102. The clamping bolt 104 is clamped in a first position of the clamping lever 102, and the clamping bolt 104 is released in a second position of the clamping lever 102. In the released position of the clamping lever 102, a clamping block 106 arranged on the holding slide 30 can be lifted out of a corresponding clamping toothing 108, which is complementary to said clamping block and is arranged on the guide box 32, in such a manner that the guide box 32 can be displaced longitudinally in relation to the holding slide 30 along the direction defined by the axis of the steering spindle 10.

When the clamping bolt 104 is open, pivoting of the guide box 32 about the axis defined by a pivot axis 105 can also be carried out, and therefore the steering wheel (not shown here) can be adapted in the interior of the motor vehicle to the seat position of the driver both by means of a longitudinal adjustment and also by means of a height adjustment. If an ideal position has been found for the driver, this position is locked again for the driving mode via the clamping lever 102. Such a positional adjustment for a steering column 1 is basically known.

The energy absorption element 4 is connected via fastening bolts 24 to the bracket 20 and accordingly to the supporting unit 2. The energy absorption element 4 is furthermore connected via fastening bolts 34 to the holding slide 30 and accordingly to the displacement unit 3. Accordingly, the energy absorption element 4 is fixedly connected both to the displacement unit 3 and to the supporting unit 2 and is arranged therebetween. As long as the energy absorption element 4 is not deformed, it ensures a fixed positional relationship between supporting unit 2 and displacement unit 3. The energy absorption element 4 is correspondingly dimensioned in such a manner that it opposes a displacement of the displacement unit 3 in relation to the supporting unit 2 during normal operation. A deformation of the energy absorption element 4 therefore does not occur, and therefore neither does a displacement of the displacement unit 2 in relation to the supporting unit 3, neither during normal driving of the motor vehicle nor if the driver supports himself on the steering wheel, for example when entering and exiting the vehicle.

FIGS. 4 to 8 show different configurations of the energy absorption element 4 which can be used with the steering column 1 shown in FIGS. 1 to 3.

The geometrical basic shape, the material and the material strength are identical in the energy absorption elements 4 shown in FIGS. 4 to 8. In other words, the sheet steel billet, on the basis of which the energy absorption element 4 is bent, is identical in all embodiments and also the punching and bending tools required for the production are identical for all energy absorption elements 4. In other words, the initial energy absorption element 4 is identical for all embodiments.

The energy absorption element 4 comprises recesses 42 through which the fastening bolts 24 for fastening the energy absorption element 4 to the supporting unit 2 can be guided. Furthermore, recesses 44 are provided through which the fastening bolts 34 for fastening the energy absorption element 4 to the displacement unit 3 and in particular to the holding slide 30 are guided. In a preferred configuration, at least one recess 45 is also provided for the insertion of a locking bolt 35. In the event of a crash, the locking bolt 35 can be pulled, preferably pyrotechnically, out of the recess 45 if the energy absorption level of the energy absorption element 4 is intended to be reduced. This may be desirable, for example, if it has been detected that the driver is wearing his seatbelt. If the driver is not wearing his seatbelt, the locking bolt 35 remains in the recess 45 and a higher energy absorption level is provided.

In the exemplary embodiment shown, the energy absorption element 4 is designed as a bending tear tab and has notches 40 along which the energy absorption element 4 can tear in the event of a crash. At the same time, a tab 400 formed by the tearing is twisted in the event of a crash. Energy is therefore absorbed both by the bending process of the tab 400 and by the energy absorption element 4 tearing along the notches 40, and therefore energy can be absorbed over the entire displacement path.

In order now to be able to use the energy absorption element 4 for use with different types of vehicle which impose different requirements on the energy absorption behavior, regions of the energy absorption element 4 are subject to a local laser solidification 5.

For the local laser solidification, a laser beam introduces solidification tracks into the material of the basic billet of the energy absorption element 4. The solidification tracks are introduced here preferably into the untreated sheet steel billet by the laser. For hardenable steels, use is made for this purpose of the martensitic hardness increase, which is known from welding said materials, in the seam region specifically for the local laser solidification.

In order to achieve the local laser solidification, use is made of a laser L which is indicated schematically in FIGS. 4 to 8 and which guides a focused laser beam S, indicated schematically in FIGS. 4 to 8, at a defined speed over the surface of the sheet steel billet which has already been bent to a finished state. By means of the concentrated application of heat, local heating is achieved which leads to hardening of the material or to brief melting with subsequent solidification, what is referred to as remelt hardening. By the rapid dissipation of heat into the adjacent cold material, rapid cooling of the heated or melted material can be achieved. This results in a local phase change, for example a martensitic hardness increase, in the material structure of the energy absorption element 4 and therefore in a significant increase in strength. The energy absorption behavior of the energy absorption element 4 can therefore be varied depending on the shape, number, arrangement and width of the local laser solidifications 5.

The local laser solidifications 5 can be introduced into the energy absorption element 4 at a high process speed by irradiation with the laser beam S. A variation in the energy absorption behavior of the energy absorption element 4 can therefore be achieved rapidly and cost-effectively. In particular, for this adaptation, the geometry, the material and the material strength of the initial energy absorption element 4 do not have to be changed.

In the event of a crash, complex and rapid deformation operations customarily take place in the energy absorption element 4. By means of the local laser solidifications 5, the deformation resistance of the energy absorption element 4 is varied and can thus contribute to achieving a desired energy absorption level. The behavior of compressive stresses and bending stresses can be varied here.

Figure 4:
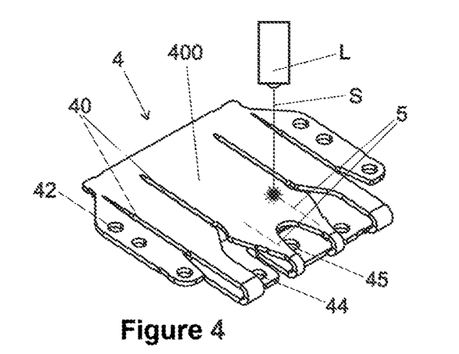
FIG. 4 is a perspective view of an example energy absorption element in the form of a bending tear tab with a local laser solidification.

The exemplary embodiment shown in FIG. 4 schematically shows the laser L which introduces a local laser solidification 5 in the energy absorption element 4 by action upon the material with laser energy by the laser beam S. In the exemplary embodiment shown in FIG. 4, the local laser solidification 5 is designed in the form of two lines which are arranged parallel to each other, extend in the tab 400 and extend in the direction of the notches 40 and therefore also in the tearing direction.

The term "line" or "linear" is understood here as meaning a region with a finite width and a significantly longer extent in the linear direction than in the width direction. In particular, a mathematical line is not meant by this. The line width is customarily determined by the diameter and the energy of the laser beam S striking on the material of the energy absorption element 4.

Via the introduction of the local laser solidifications 5 by means of the laser L a corresponding change in the material in the energy absorption element 4 can be caused in such a manner that the energy absorption properties of the energy absorption element 4 are influenced by the local laser solidifications 5.

Figure 5:
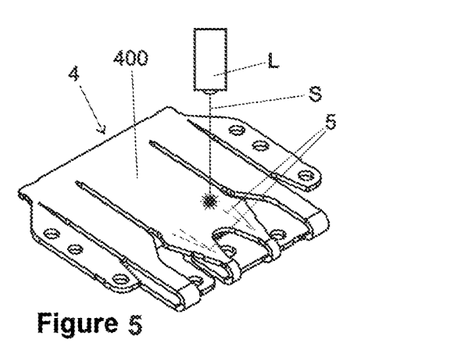
FIG. 5 is a perspective view of another example energy absorption element in the form of a bending tear tab with a local laser solidification.

FIG. 5 shows a further exemplary embodiment of a further energy absorption element 4 which has the same basic structure as the energy absorption element 4 shown in FIG. 4. However, the local laser solidifications 5 introduced by means of the laser L are introduced in a different configuration or in a different shape into the energy absorption element 4. In the exemplary embodiment shown in FIG. 5, the local laser solidifications 5 are shown in the form of a zigzag line in the tab 400.

Figure 6:
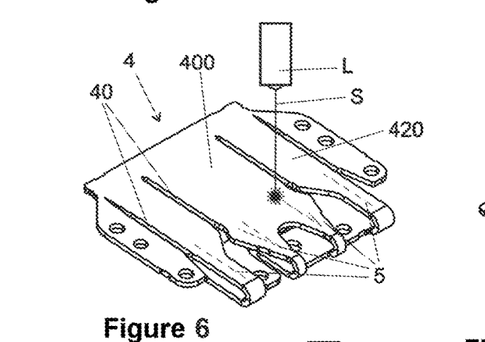
FIG. 6 is a perspective view of still another example energy absorption element in the form of a bending tear tab with a local laser solidification.

In FIG. 6, local laser solidifications 5 are provided not only in the region of the tab 400 but also in those parts 420 of the energy absorption element 4 that do not form the tab. The local laser solidifications 5 in the parts 420 not forming the tab are designed as rectilinear solidification lines extending parallel to the notches 40. The local laser solidifications 5 provided in the tab 400 are in turn arranged in the form of a zigzag line.

Figure 7:
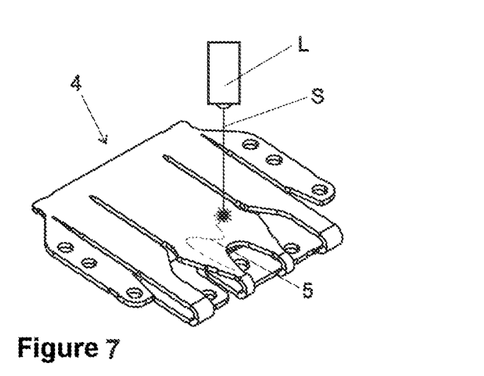
FIG. 7 is a perspective view of yet another example energy absorption element in the form of a bending tear tab with a local laser solidification.

FIG. 7 shows a further embodiment of an energy absorption element 4 in which a local laser solidification 5 is introduced in the form of a meandering line by the laser L.

Figures 8, 9:
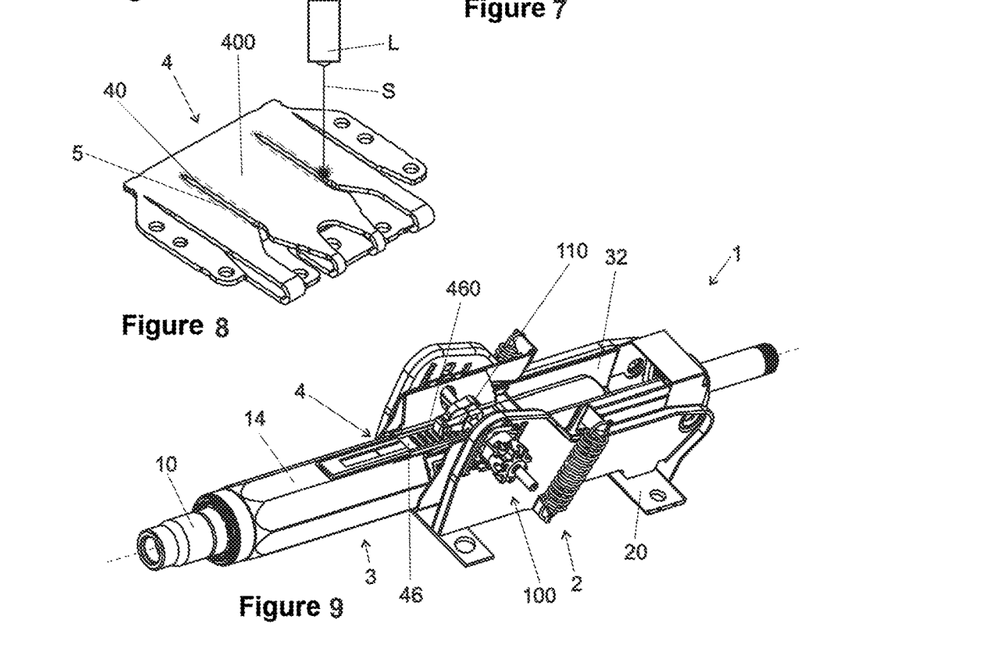
FIG. 8 is a perspective view of another example energy absorption element in the form of a bending tear tab with a local laser solidification.
FIG. 9 is a schematic perspective view of a further example steering column in an initial state.

By contrast, FIG. 8 shows an energy absorption element 4 in which local laser solidifications 5 which follow the contours of the notches 40 of the tab 400 are provided. In addition to the adaptation of the energy absorption level, the defined tearing of the bending tear tab in the notches is assisted by the solidification along the contour of the notches 40 since the adjacent regions of the notch have increased strength.

The local laser solidifications 5 necessary for achieving the respective requirements imposed on the energy absorption behavior of the energy absorption element 4 can be determined either via tests, or can be ascertained by means of numerical calculation methods.

The effect which can be achieved by introducing the local laser solidifications 5 into the energy absorption element 4 is that the energy absorption behavior of the energy absorption element 4 varies depending on the geometry, number, shape and thickness of the local laser solidifications 5. Accordingly, even in the event of provision of identical initial energy absorption elements 4, which have the same geometry, the same material and the same material strength, a different energy absorption behavior can be achieved by means of a variation in geometry, number, shape and thickness of the local laser solidifications 5. With an initial energy absorption element 4, a multiplicity of energy absorption levels can therefore be achieved, and therefore a multiplicity of different types of motor vehicle, which each have different requirements regarding the energy absorption level, can be equipped with an individual basic form of an energy absorption element 4.

This results in a flexible and modular construction of the steering column 1 to the effect that an individual type of steering column 1 can be installed in a multiplicity of different motor vehicles using identical parts, and it is merely necessary, by means of a laser L, for local laser solidifications 5 to be introduced into the respective energy absorption elements 4, by means of which laser solidifications the respectively desired energy absorption level for the respective type of vehicle is achieved.

The introduction of the local laser solidifications 5 can take place at different stations in the production process. In particular, however, it can also take place when the steering column 1 is already completely fitted with the energy absorption element 4. Accordingly, the adaptation of the respective steering column 1 may also take place shortly before installation in the motor vehicle.

By this means, an improved efficiency and cost structure in the production of the steering column can be achieved.

FIG. 9 shows a schematic perspective illustration of a further steering column 1 which likewise comprises a supporting unit 2, in relation to which a displacement unit 3, which comprises a steering column tube 14, is arranged displaceably in a guide box 32. The steering column tube 14, in which the steering spindle 10 is rotatably mounted, is displaceable in relation to the guide box 32 and also in relation to the bracket 20 in the event of a crash.

Figures 10, 11:
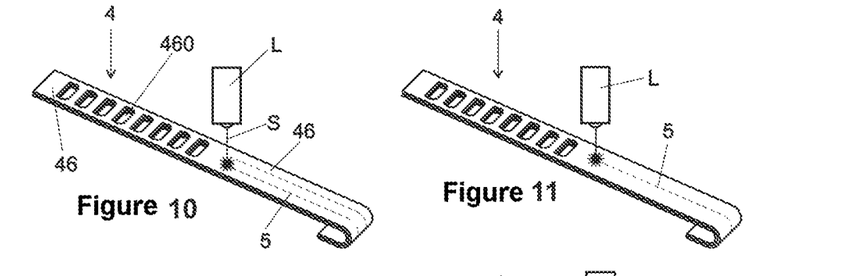
FIG. 10 is a perspective view of an example energy absorption element in the form of a bending tab for the steering column of FIG. 9.
FIG. 11 is a perspective view of another example energy absorption element in the form of a bending tab for the steering column of FIG. 9.
Figures 12, 13, 14, 15, 16:
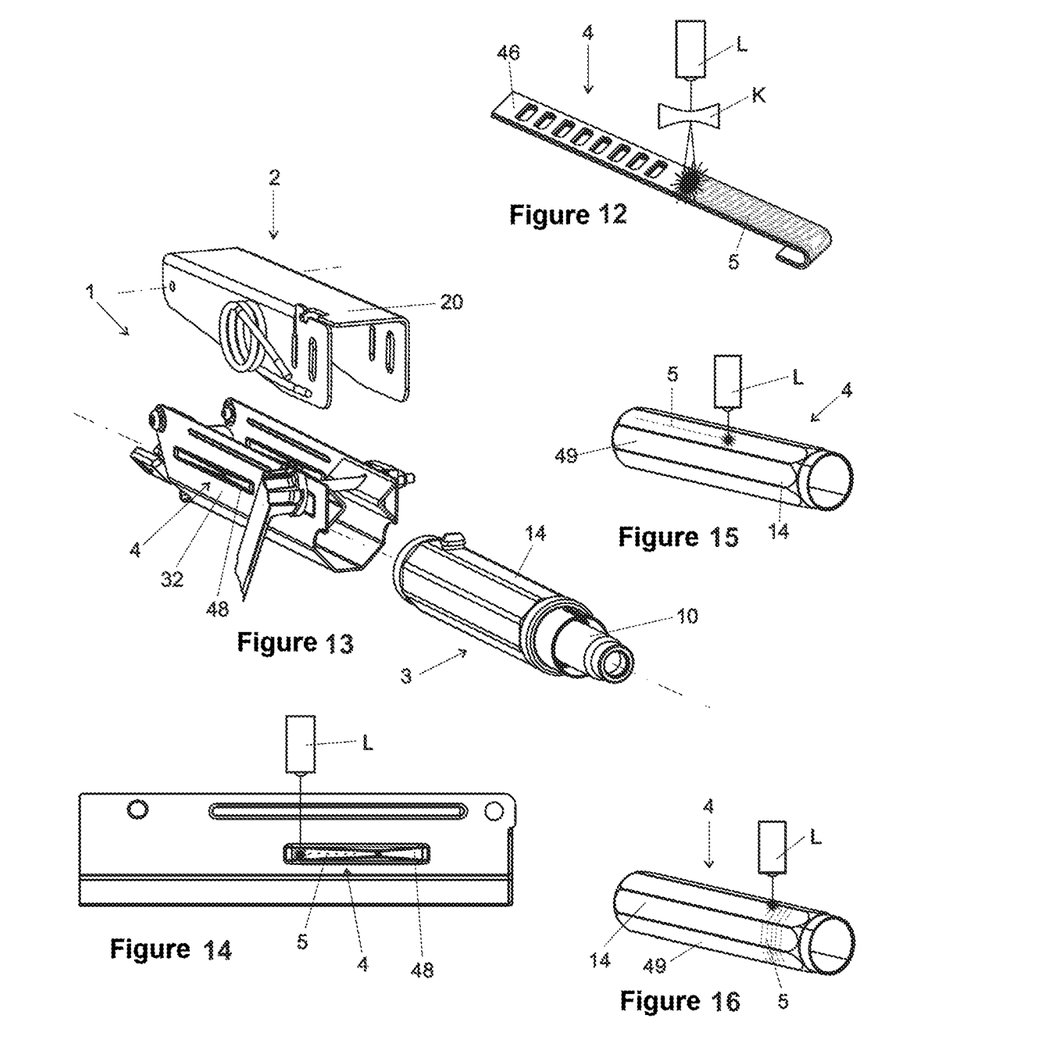
FIG. 12 is a perspective view of still another example energy absorption element in the form of a bending tab for the steering column of FIG. 9.
FIG. 13 is a schematic, perspective, partially exploded view of an example steering column.
FIG. 14 is a schematic side view of an example holding box of the steering column of FIG. 13 with an example energy absorption element in the form of a crash bead.
FIG. 15 is a schematic perspective view of an example energy absorption element in the form of a crash sleeve.
FIG. 16 is a schematic perspective view of a further example energy absorption element in the form of a crash sleeve.

An energy absorption element 4 is provided between the steering column tube 14 and the guide box 32, wherein said energy absorption element is illustrated in the form of the bending tab 46 which is shown by way of example in different forms in FIGS. 10 to 12. The bending tab 46 has recesses 460 in which latching cams 110 of a clamping mechanism 100 engage. The steering column tube 14 can thus be adjusted longitudinally in relation to the guide box 32 in the direction of the axis of the steering spindle 10 if the latching cam 110 is not in engagement with the recesses 460 of the bending tab 46. If the latching cam 110 engages in the recess 460 of the bending tab 46 of the energy absorption element 4, the steering column 1 can only still be longitudinally adjusted by deformation of the bending tab 46.

Accordingly, in the event of a crash, a displacement of the displacement unit 3 comprising the steering column tube 14, in relation to the supporting unit 2, comprising the guide box 32, is possible by deformation of the energy absorption element 4 in the form of the bending tab 46.

FIGS. 10 to 12 each show the same basic geometry of the bending tab 46 with its recesses 460, and different designs of the local laser solidifications 5 are shown, by means of which the energy absorption level of the energy absorption element 4 can be varied. Accordingly, a variation in the energy absorption behavior of the energy absorption element 4 can also be achieved again here with the same initial energy absorption element 4 by means of a corresponding treatment to produce the local laser solidifications 5.

FIGS. 10 and 11 show examples of respective local laser solidifications 5 in the form of lines extending along the bending tab 46 (FIG. 10) or a single line (FIG. 11). In FIG. 12, the laser L is expanded using an expansion lens K, and therefore the local laser solidification 5 here substantially comprises the entire area of the bending tab 46.

The principle in the exemplary embodiment shown in FIGS. 9 to 12 is in turn the same as that in the exemplary embodiment shown in FIGS. 1 to 8, namely an energy absorption element 4, which is arranged between a supporting unit 2 and a displacement unit 3, for a large number of different use regions as provided from an initial energy absorption element, and the actual adjustment of the energy absorption level takes place via the introduction of local laser solidifications 5 which are each adapted to the desired intended purpose.

FIGS. 13 and 14 show yet another exemplary embodiment of a steering column 1, wherein FIG. 13 shows a supporting unit 2, which comprises a guide box 32 and a bracket 20, and wherein the displacement unit 3 is accommodated in the guide box 32 in the form of the steering column tube 14 which, for its part, rotatably supports the steering spindle 10.

An energy absorption element 4 in the form of a crash bead 48 is provided in the guide box 32, said crash bead being arranged between the displacement unit 3 and the supporting unit 2 in such a manner that, when the displacement unit 3 is displaced in relation to the supporting unit 2, the energy absorption element 4 in the form of the crash bead 48 is deformed.

As emerges from FIG. 14, the energy absorption element 4 in the form of the crash bead 48 can be provided, by means of a laser L, with local laser solidifications 5 by means of which the energy absorption level of the energy absorption element 4 can be secured and in particular can be varied when the steering column 1 from FIGS. 13 and 14 is intended to be used in different types of motor vehicle.

The local laser solidifications 5 introduced into the crash bead 48 can correspondingly vary in turn with regard to their shape, their number and their width in such a manner that different energy absorption levels of the crash bead 48 can be provided. The guide box 32 with the crash bead 48, and in particular the crash bead 48 can be correspondingly used as the basic energy absorption element 4 for a multiplicity of different types of motor vehicle.

FIGS. 15 and 16 show a further energy absorption element 4 which is provided in the form of a steering column tube 14 which is designed as a crash sleeve 49 and is accordingly arranged in turn between a displacement unit and a supporting unit. In the event of a crash, the energy absorption element 4 can be deformed by absorbing energy. Local laser solidifications 5 can be introduced by means of a laser L, wherein, in FIG. 15, a local laser solidification 5 is applied in the form of a line extending in the axial direction of the steering column tube 14, and, instead, FIG. 16 shows a local laser solidification 5 which extends around the steering column tube 14 helically or in circumferential circles spaced equidistantly from one another.

If applicable, all of the individual features which are illustrated in the individual exemplary embodiments may be combined with one another and/or interchanged for one another without departing from the scope of the invention.

What is claimed is:

1. A steering column for a motor vehicle comprising:
    a supporting unit that is connectable to a chassis of the motor vehicle;
    a displacement unit that is displaceable relative to the supporting unit along a displacement path in a crash event; and
    an energy absorption element disposed between the supporting unit and the displacement unit, the energy absorption element comprising a local laser solidification on or adjacent local areas of the energy absorption element that are configured to preferentially deform and/or tear relative to other areas of the energy absorption element, wherein the energy absorption element is configured to absorb energy over the displacement path in the crash event and wherein the other areas are free of local laser solidification.

2. The steering column of claim 1 wherein the energy absorption element is at least one of a bending tab, a bending wire, a bending tear tab, a crash bead, or a crash sleeve.

3. The steering column of claim 1 wherein the local laser solidification is linear.

4. The steering column of claim 1 wherein the local laser solidification is polygonal.

5. The steering column of claim 1 wherein the local laser solidification has a zigzag shape or a meandering shape.

6. The steering column of claim 1 wherein the local laser solidification is disposed along an outer contour of the energy absorption element.

7. The steering column of claim 1 wherein the local laser solidification is disposed along an inner contour of the energy absorption element.

8. The steering column of claim 1 wherein the local laser solidification is disposed over a partial surface of the energy absorption element or over a full surface of the energy absorption element.

9. The steering column of claim 1 wherein the local laser solidification in the energy absorption element is provided in a linear, polygonal, zigzag-shaped, or meandering manner, in a manner lying in an area of the energy absorption element or lying along an outer contour and/or along an inner contour of the energy absorption element, or as a line, as a partial surface, and/or over a full surface.

10. The steering column of claim 1 wherein the local laser solidification comprises a first local laser solidification and a second local laser solidification, wherein the first and second local laser solidifications vary in at least one of width, number of branches, or arrangement.

11. The steering column of claim 1 wherein a configuration of the local laser solidification is based at least in part on a region in which the steering column is to be used.

12. The steering column of claim 1 wherein the supporting unit is configured as a bracket and the displacement unit is configured as a holding slide for holding guide box.

13. The steering column of claim 1 wherein the displacement unit is configured as a steering column adjustment.

14. The steering column of claim 1 wherein the local laser solidification comprises a plurality of local laser solidifications having configurations that vary in at least one of width, number of branches, or arrangement, wherein an energy absorption level of the energy absorption element depends on the configurations of the local laser solidifications.

15. The steering column of claim 1 wherein the local laser solidification is achieved by a variation in width, number and/or arrangement of constituent local laser solidifications in order to select a desired energy absorption level of the energy absorption element.

16. The steering column of claim 1 wherein the energy absorption element has a plurality of local laser solidifications that are selected from two different possible local laser solidifications that vary in width, number, and/or arrangement.

17. The steering column of claim 1 wherein the energy absorption element is selected from at least two energy absorption elements with different local laser solidifications depending on a region of use of the steering column.

18. A method of adapting an energy absorption behavior of a steering column that comprises an energy absorption element to a type of motor vehicle, the method comprising introducing local laser solidifications into the energy absorption element on or adjacent local areas of the energy absorption element that are configured to preferentially deform and/or tear relative to other areas of the energy absorption element, wherein the other areas are free of local laser solidification.

19. The method of claim 18 further comprising determining at least one of a geometry, a number, a shape, or a thickness of the local laser solidification based on a desired energy absorption level.

20. The steering column of claim 1, wherein the areas of the energy absorption element that are configured to preferentially deform and/or tear include notches.

21. A steering column for a motor vehicle comprising:
a supporting unit that is connectable to a chassis of the motor vehicle;
a displacement unit that is displaceable relative to the supporting unit along a displacement path in a crash event; and
an energy absorption element disposed between the supporting unit and the displacement unit, the energy absorption element comprising a steering column tube including a local laser solidification, wherein the energy absorption element is configured to absorb energy over the displacement path in the crash event.

22. The steering column of claim 21, wherein the local laser solidification is disposed helically or in circumferential circles spaced along the steering column tube equidistantly from one another.

* * * * *